US009298605B1

(12) United States Patent
Hara

(10) Patent No.: US 9,298,605 B1
(45) Date of Patent: Mar. 29, 2016

(54) MEMORY ALLOCATOR ROBUST TO MEMORY LEAK

(71) Applicant: Google Inc., Mountain View, CA (US)

(72) Inventor: Kentaro Hara, Tokyo (JP)

(73) Assignee: Google Inc., Mountain View, CA (US)

( * ) Notice: Subject to any disclaimer, the term of this patent is extended or adjusted under 35 U.S.C. 154(b) by 304 days.

(21) Appl. No.: 13/956,173

(22) Filed: Jul. 31, 2013

(51) Int. Cl.
*G06F 12/00* (2006.01)
*G06F 12/02* (2006.01)

(52) U.S. Cl.
CPC .................................. *G06F 12/0246* (2013.01)

(58) Field of Classification Search
CPC ..... G06F 1/12; G06F 11/0709; G06F 11/076; G06F 11/0793; G06F 3/0481
See application file for complete search history.

(56) References Cited

U.S. PATENT DOCUMENTS

| | | | |
|---|---|---|---|
| 7,127,582 B2 | 10/2006 | Marinescu et al. | |
| 7,234,080 B2 | 6/2007 | Cirne et al. | |
| 7,765,375 B2 | 7/2010 | Yamada et al. | |
| 8,914,582 B1 * | 12/2014 | Trimble et al. | 711/136 |
| 2009/0276205 A1 | 11/2009 | Jennings et al. | |
| 2010/0131721 A1 | 5/2010 | Title et al. | |
| 2011/0040976 A1 * | 2/2011 | Yairi et al. | 713/178 |

OTHER PUBLICATIONS

IBM, "Method for Reusing Memory in an Out of Memory Situation", IP.com Prior Art Database, Sep. 9, 2009, 3 pgs.

* cited by examiner

*Primary Examiner* — Yong Choe
(74) *Attorney, Agent, or Firm* — McDermott Will & Emery LLP

(57) ABSTRACT

The subject technology discloses configurations for selecting a set of objects stored in volatile memory that have not been recently used by the application in which each object from among the set of object resides at a respective range of memory addresses in the volatile memory and each object was created by the application. Memory protection is set on the respective range of addresses in the volatile memory for each object from among the set of objects in which the memory protection flags the respective range of addresses for handling when the application subsequently performs a read or write operation to the respective range of addresses. The subject technology copies the set of objects from the volatile memory to a non-volatile memory. The respective range of memory addresses in the volatile memory are freed for each object from among the set of objects.

20 Claims, 5 Drawing Sheets

MEMORY ALLOCATOR ROBUST TO MEMORY LEAK

BACKGROUND

The subject technology generally relates to memory management provided by an operating system or application.

SUMMARY

The subject technology provides for a computer-implemented method, the method including: responsive to determining that a total memory usage of an application exceeds a predefined threshold, performing the following operations: selecting a set of objects stored in volatile memory that have not been recently used by the application in which each object from among the set of object resides at a respective range of memory addresses in the volatile memory and each object was created by the application; setting memory protection on the respective range of addresses in the volatile memory for each object from among the set of objects in which the memory protection flags the respective range of addresses for handling when the application subsequently performs a read or write operation to the respective range of addresses; copying the set of objects from the volatile memory to a non-volatile memory; and freeing the respective range of memory addresses in the volatile memory for each object from among the set of objects.

The subject technology further provides for a computer-implemented method, the method including: detecting an access to an object stored in non-volatile memory by an application, wherein the access references a range of memory addresses of volatile memory where the object is stored; determining if the range of memory addresses of the volatile memory is set to memory protection in which the memory protection has flagged the range of memory addresses for handling when the application performs an operation on the respective range of addresses; responsive to determining that the range of memory addresses is set to memory protection, determining a set of memory addresses in a non-volatile memory where the object is stored; moving the object from the set of memory addresses in the non-volatile memory for storing in the range of memory addresses in the volatile memory; and accessing the object stored in the range of memory addresses in volatile memory.

Yet another aspect of the subject technology provides a system. The system includes one or more processors, and a memory including instructions stored therein, which when executed by the one or more processors, cause the processors to perform operations including: responsive to determining that a total memory usage of an application exceeds a predefined threshold, performing the following operations: selecting a set of objects stored in volatile memory that have not been recently used by the application in which each object from among the set of object resides at a respective range of memory addresses in the volatile memory and each object was created by the application; setting memory protection on the respective range of addresses in the volatile memory for each object from among the set of objects in which the memory protection flags the respective range of addresses for handling when the application subsequently performs a read or write operation to the respective range of addresses; copying the set of objects from the volatile memory to a non-volatile memory; and freeing the respective range of memory addresses in the volatile memory for each object from among the set of objects.

The subject technology further provides for a non-transitory machine-readable medium comprising instructions stored therein, which when executed by a machine, cause the machine to perform operations including: responsive to determining that a total memory usage of an application exceeds a predefined threshold, performing the following operations: selecting a set of objects stored in volatile memory that have not been recently used by the application in which each object from among the set of object resides at a respective range of memory addresses in the volatile memory and each object was created by the application; setting memory protection on the respective range of addresses in the volatile memory for each object from among the set of objects in which the memory protection flags the respective range of addresses for handling when the application subsequently performs a read or write operation to the respective range of addresses; copying the set of objects from the volatile memory to a non-volatile memory; and freeing the respective range of memory addresses in the volatile memory for each object from among the set of objects.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
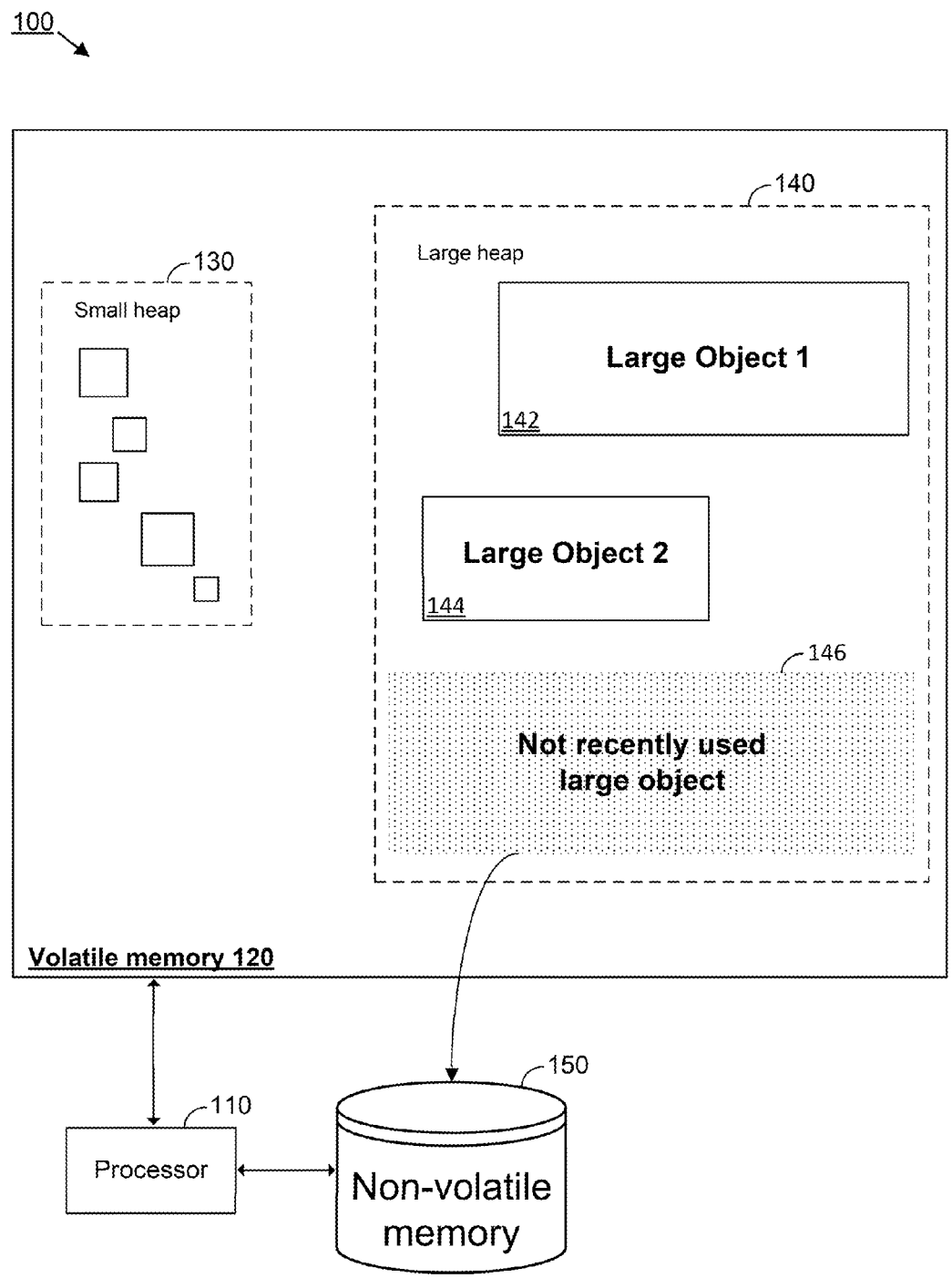
FIG. 1 conceptually illustrates an example computing architecture in which some configurations of the subject technology may be implemented FIG. 2 conceptually illustrates an example computing architecture in which some configurations of the subject technology may be implemented.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

In software applications of a given scale, it may be difficult to avoid memory leaks. Memory leaks may be serious and consume resources in a computing system. In a software application that is implemented via object-oriented code, a memory leak may happen when an object is stored in memory but cannot be accessed by the running code. In one example, if one object leaks memory, all objects reachable from the leaked object are kept alive. Consequently, one memory leak can cause significant memory bloat. Although existing development tools are available to detect memory leaks, in large-scale software, it may be difficult to eliminate memory leaks.

Given the above, the subject technology provides a memory allocator that can tolerate memory leaks. The memory allocator aims to reduce memory bloat even when memory leaks. In general, memory bloat is caused by large objects. Large objects may account for most of the total memory usage. For example, in a situation where a given software application is consuming 4 GB memory, it may be likely that large objects (e.g., sizes larger than 1 MB) account for 80% of the 4 GB usage. The memory allocator evacuates or moves recently unused large objects from volatile memory to non-volatile memory or disk(s), and restores the objects back to volatile memory on demand. As used herein, the term "evacuate" includes its plain and ordinary meaning, and refers to moving an object from volatile memory into non-volatile memory (e.g., a disk, flash memory, etc.).

The subject technology may be implemented at the level of applications (e.g., memory allocators) and the memory allocator therefore can utilize knowledge about how a given application allocates objects on memory and, thus, manage memory at the object level. In the case of a swap file utilized by an operating system, the operating system may be limited to observing a list of pages in system memory and not have knowledge of memory allocation at the object level. Thus, the operating system may be restricted to swapping entire pages to the swap file irrespective of how objects (e.g., instantiated from applications) are allocated on the pages (e.g., spanning across different pages, solely included within a portion of a single page, etc.).

In contrast to the swap file described above, the memory allocator of the subject technology may include more capabilities for handling the memory allocation of objects. For instance, the memory allocator can pack small objects into one heap and pack large objects into the other heap. The memory allocator can also choose the least recently used large objects for evacuation. In some instances, there is a minimum risk to evacuate a number of small objects to disk or evacuate a part of the large objects to disk. Since the memory allocator can identify which objects are likely to be the culprit of the memory bloat (e.g., the memory allocator identifies the objects that should be evacuated to resolve the memory bloat), the memory allocator can make a better decision for evacuation at the object level.

In some configurations, when the memory allocator moves large objects from memory to disks, the memory allocator sets read/write protection on the addresses where the evacuated objects resided. When an application accesses the protected addresses afterward, the memory allocator can detect the access by trapping a signal handler in one example. Then the memory allocator restores the objects from disks back to memory so that the application may continue running without recognizing that object was transferred to disk.

In more detail, the subject technology provides a heap data structure that is split into two heaps: 1) a heap for small objects (small heap) and 2) a heap for large objects (large heap). The small heap is managed normally similar to a library that provides memory allocation (e.g., the C standard library including malloc( )). The memory allocator allocates small objects (e.g., size smaller than 1 MB) on the small heap. The large heap is managed in a different manner than the small heap. The memory allocator allocates large objects (e.g., size equal to or larger than 1 MB) on the large heap. Each object in the large heap is allocated by using an mmap( ) function, which establishes a mapping between an address space of a process and a memory object in one example. All objects in the large heap are aligned to a page size of an operating system (e.g., 4 KB in Linux) in one example. Further, no two objects reside in the same page in one example.

When a total memory usage exceeds a predefined threshold (e.g., 2 GB), the memory allocator may run the following steps (e.g., in a background thread):

(1) The memory allocator selects large objects that have not been recently used. The memory allocator can use an LRU algorithm to select the objects to be evacuated.

(2) The memory allocator sets read/write protection on the addresses where the objects had resided.

(3) The memory allocator copies the selected objects to disks.

(4) The memory allocator reclaims memory of the selected objects. By doing this, the total memory usage decreases. At this point, the addresses where the selected objects had resided are in a status that physical memory is not mapped but page tables are set with read/write protection.

In one example, steps 3 and 4 above may be executed in a background thread without blocking a user program.

When a user application accesses an object that is already evacuated to disk or that is being evacuated to disks, the memory allocator can detect the access by trapping a signal handler. Then the memory allocator restores the object from disks to the original address in the context of the signal handler. In this way, the user application can continue running without recognizing the evacuation has occurred.

In some configurations, the memory allocator cannot reuse addresses that had been used by evacuated objects because the addresses are reserved for when the evacuated objects are restored to the addresses in the future. Selecting objects that are less likely to be accessed in the future may be implemented utilizing an LRU algorithm. However, in certain operating systems (e.g., Linux, Mac OS and Windows), there is no way to obtain an access timestamp for a given page in memory (e.g., a Linux kernel manages access timestamps but does not expose system calls to obtain the timestamps). Thus, the operating system may not be relied upon to obtain timestamps in some example. Consequently, the subject technology may manage timestamps of accesses to pages in memory as described in the following example.

For an object that has existed in memory for a certain amount of time since the object was created, the memory allocator sets read/write protection on the object. When the object is accessed, the memory allocator can detect the access by being notified by a signal handler. In some examples, the signal handler may be a component of the operating system or integrated as part of the application that monitors activity from the application and executes one or more operations for handling the activity by responding in a predetermined manner. In this example, the signal handler may detect a read or write operation to one or more memory addresses and subsequently notify the memory allocator. In response to being notified, the memory allocator unsets the read/write protection, so that a user program can continue running. From this point, the memory allocator may not set read/write protection on the object for a predetermined amount of time. In this manner, even for frequently accessed objects, read/write protection is set (and thus a signal handler is trapped) at each predetermined time interval. By optimizing this time interval, the subject technology can reduce the overhead down to an acceptable value.

When the memory allocator wishes to select objects to be evacuated, the memory allocator selects objects in the order of elapsed time since read/write protection is set on the objects. Objects that do not have read/write protection are not candidates for evacuation. In this manner, the memory allocator can select objects in an approximate LRU order.

FIG. 1 conceptually illustrates an example computing architecture 100 in which some configurations of the subject technology may be implemented. For instance, the example shown in FIG. 1 illustrates an example implementation of storing objects in two separate heaps. In one example, the computing architecture 100 may be implemented by a computing device (e.g., desktop, mobile device, laptop, etc.) or system.

As illustrated in the example of FIG. 1, a processor 110 may execute one or more instructions for a given application (e.g., web browser, etc.) that stores respective sets of objects in volatile memory 120. One or more objects may be created by the application during execution. For example, a set of objects corresponding to the application are stored in a small heap 130 and a different set of objects corresponding to the application are stored in a large heap 140. As shown, the large heap 140 includes respective large objects 142, 144 and 146, each of which are larger than a predetermined threshold size (e.g., 1 MB). It should be appreciated that fewer or more objects may be included in FIG. 1 and still be within the scope of the subject technology. The subject technology therefore provides memory management of an application at the object level.

In some configurations, the processor may execute instructions for the application that perform memory management by moving objects from volatile memory to non-volatile memory responsive to determining that the application's total memory usage exceeds a predefined threshold amount (e.g., greater than 1 GB, etc.). In one example, the processor may execute such instructions that determine a set of objects that have not been recently used or accessed by the application. As described above, determining objects that have not been recently used may be accomplished by various approaches (e.g., LRU algorithm, timestamps, etc.). In the example of FIG. 1, the large object 146 is indicated as an object not recently used by the application. The processor 110 may execute instructions for moving the large object 146 to non-volatile memory 150. After moving the large object 146, the processor 110 may execute instructions to set a range of addresses where the large object 146 was stored as being memory protected (e.g., read or write protection).

Figure 2:
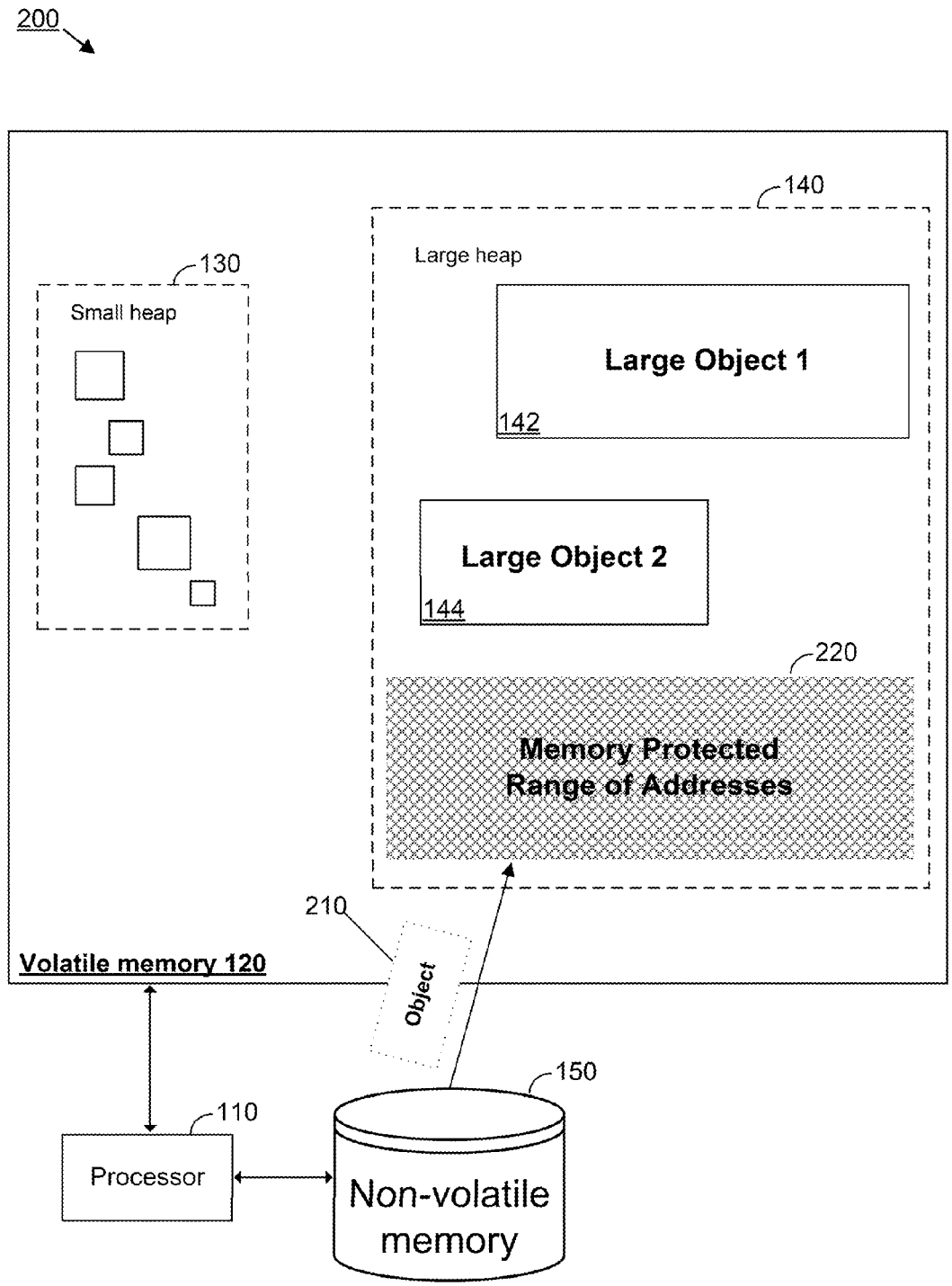

FIG. 2 conceptually illustrates an example computing architecture 200 in which some configurations of the subject technology may be implemented. For instance, the example shown in FIG. 2 illustrates an example implementation of moving an object from non-volatile memory to a large heap stored in volatile memory. The example shown in FIG. 2 includes corresponding computing components that have been previously described in connection with FIG. 1. In one example, the computing architecture 200 may be implemented by a computing device (e.g., desktop, mobile device, laptop, etc.) or system.

As illustrated in the example of FIG. 2, the processor 110 may execute one or more instructions for a given application (e.g., web browser, etc.) that stores respective sets of objects in the volatile memory 120. The processor 110 may execute one or more instructions for the application that may access a memory protected range of addresses 220 in the large heap 140. Thus, the application may access a memory protected range of addresses 220 where an object (e.g., the object 146 in FIG. 1) previously resided in volatile memory 120. In response, the processor 110 may then execute one or more instructions to restore an object 210 stored in non-volatile memory 150 and move the object 210 to the memory protected range of addresses 220 in volatile memory 120. In the example of FIG. 2, the object 210 in non-volatile memory 120 corresponds to the previously stored object (e.g., the object 146 in FIG. 1) at the range of addresses 220 of the volatile memory 120.

Figure 3:
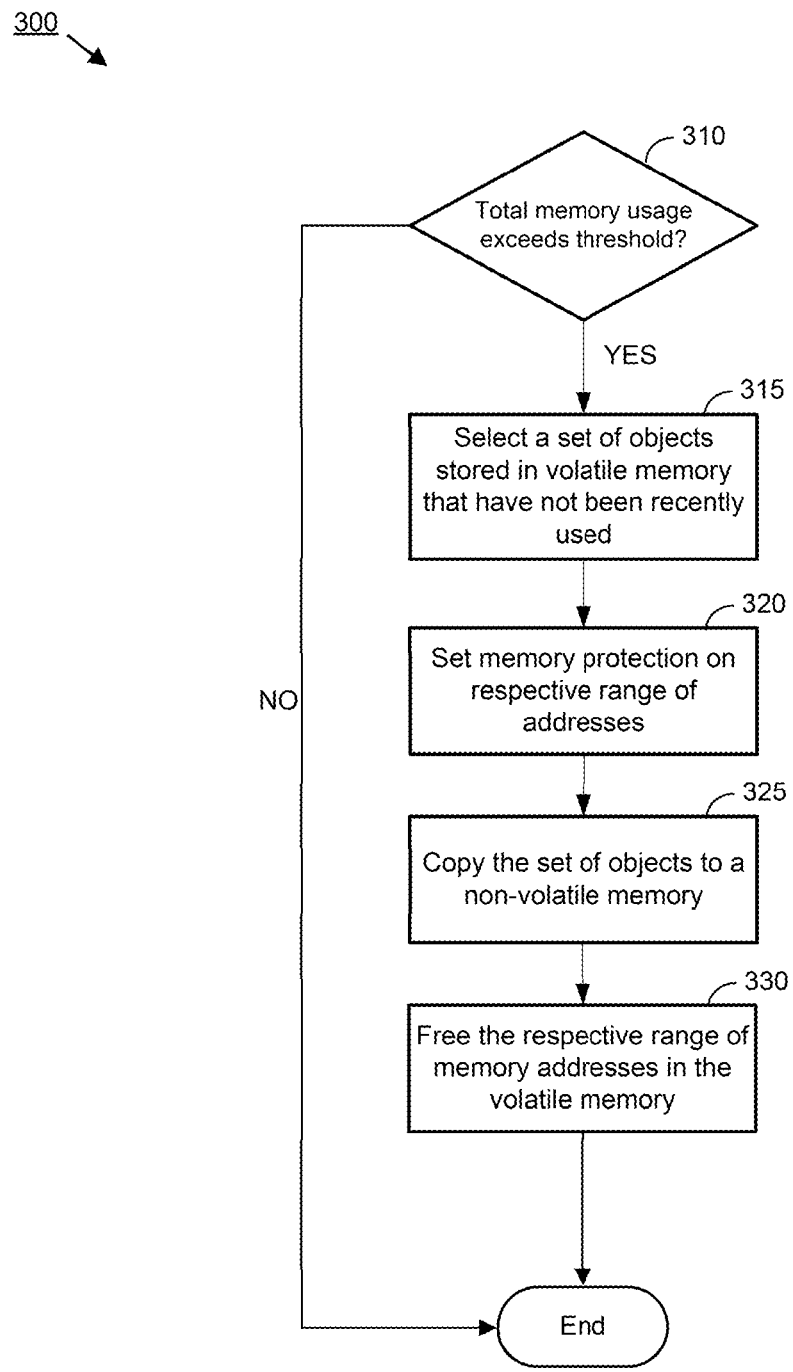
FIG. 3 conceptually illustrates an exemplary process for evacuating an object into non-volatile memory.

FIG. 3 conceptually illustrates an exemplary process 300 for evacuating an object into non-volatile memory. The process 300 can be performed on one or more computing devices or systems in some configurations.

The process 300 begins at 310 by determining whether a total memory usage of an application exceeds a predefined threshold. The total memory usage is based on an aggregate size of objects created by the application in one example. If the total memory usage does not exceed the predefined threshold, the process 300 then ends. Alternatively, responsive to determining that the total memory usage of the application exceeds the predefined threshold, the process 300 at 315 selects a set of objects stored in volatile memory that have not been recently used. In one example, each object from among the set of object resides at a respective range of memory addresses in the volatile memory. Selecting the set of objects that have not been recently used is based on a least recently used (LRU) algorithm in some configurations. The set of objects stored in the volatile memory are divided into two respective heaps in which the two respective heaps are a first heap for storing objects smaller than a predetermined size and a second heap for storing objects of equal or greater sizes than the predetermined size. The second heap may include a plurality of pages in which each page of the plurality of pages having a predetermined page size, each object stored in the second heap is aligned with the predetermined page size, and each object is stored in one or more respective pages from among the plurality of pages.

In one example, the process 300 selects the set of objects stored in volatile memory by determining a newest object stored in the second heap based on a respective timestamp of each object stored in the second heap, and selecting one or more objects stored in the second heap that are older than the newest object based on the respective timestamp of each object stored in the second heap. For instance, the respective timestamp indicates a time that the object was stored in the second heap. It is appreciated that other implementations for selecting the set of objects may be utilized and still be within the scope of the subject technology.

At 320, the process 300 sets memory protection on the respective range of addresses in the volatile memory for each object from among the set of objects. For example, the memory protection may be in the form of a read or write protection to the respective range of addresses. When read or write protection is enabled, the respective range of addresses may be flagged (e.g., in a table of memory addresses) so that an attempted read operation or write operation to one or more addresses in the respective range of addresses results in an event that triggers a signal handler (e.g., that provides handling for the read or write operation). A signal hander, in some examples, is a component that may detect an operation that attempts to access the respective range of addresses. In some configurations, the signal handler may be integrated as part of the application. In some configurations, the signal handler may be implemented as a separate process or application that monitors activity from the application that initiated the operation(s) to memory. The process 300 at 325 copies the set of objects to a non-volatile memory. The non-volatile memory is a disk storage device in one example. The process 300 at 330 then frees the respective range of memory addresses in the volatile memory for each object from among the set of objects. Freeing the respective range of memory addresses in the volatile memory reduces the total memory usage of the application and reduces a total amount of free space on the non-volatile memory in one example.

Figure 4:
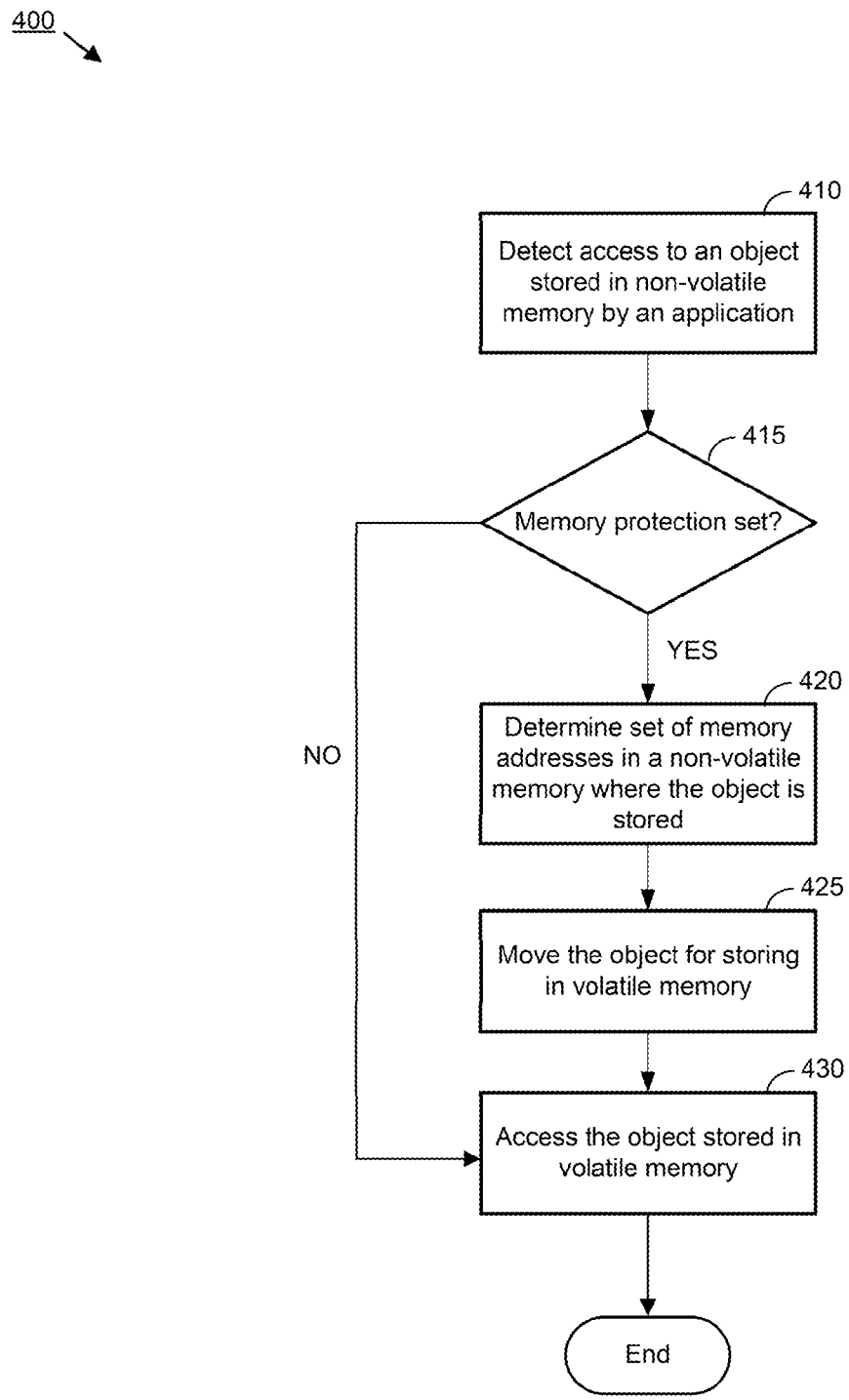
FIG. 4 conceptually illustrates an exemplary process for moving an object in non-volatile memory back to volatile memory when accessed by an application.

FIG. 4 conceptually illustrates an exemplary process 400 for moving an object in non-volatile memory back to volatile memory when accessed by an application. The process 400 can be performed on one or more computing devices or systems in some configurations.

The process 400 begins at 410 by detecting an access to an object stored in non-volatile memory by an application. In one example, the access references a range of memory addresses of volatile memory where the object is stored. The access to the object corresponds to an application that created the object. At 415, the process 400 determines if the range of memory addresses of the volatile memory is set to memory protection. If memory protection is not set, the process 400 continues to 430 in order to access the object stored in the volatile memory.

Alternatively, responsive to determining that the range of memory addresses is set to memory protection, the process 400 continues to 420 to determine a set of memory addresses in a non-volatile memory where the object is stored. At 425, the process 400 moves the object from the set of memory addresses in the non-volatile memory for storing in the range of memory addresses in the volatile memory. In one example, moving the object includes copying the object from the set of memory addresses in the non-volatile memory to the range of memory addresses in volatile memory, and then deleting the object from the non-volatile memory. The process 400 at 430 then accesses the object stored in the range of memory addresses in volatile memory. The process 400 then ends.

Many of the above-described features and applications are implemented as software processes that are specified as a set of instructions recorded on a non-transitory machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of non-transitory machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

The following description describes an example system in which aspects of the subject technology can be implemented.

Figure 5:
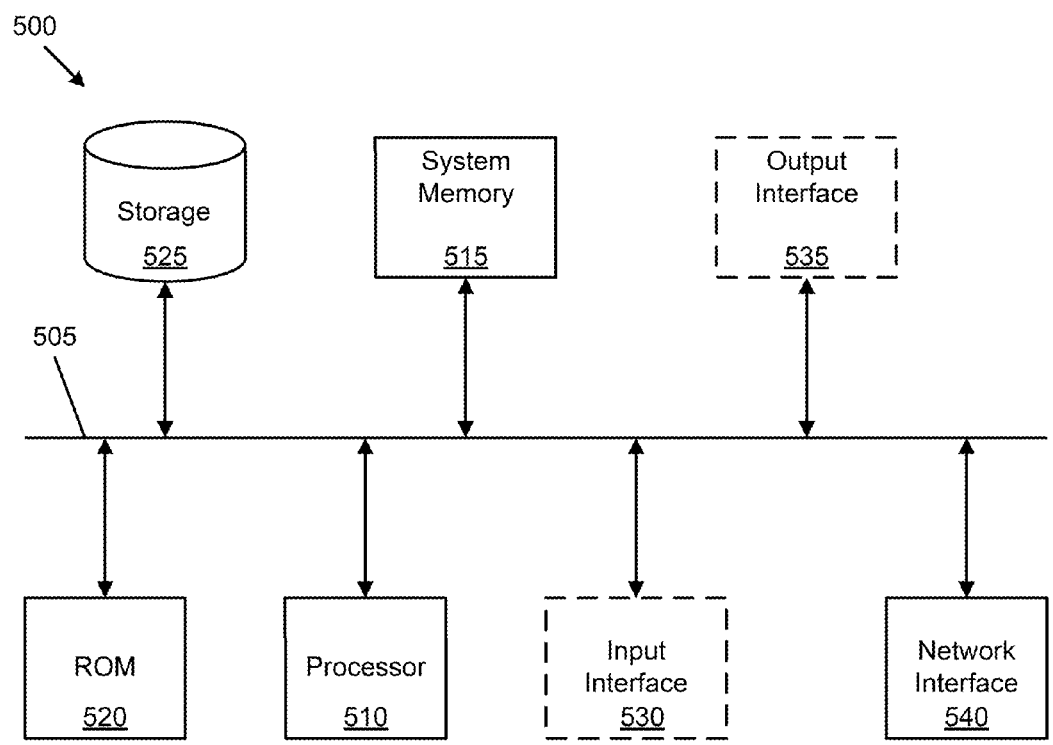
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or another sort of electronic device. In some configurations, the system 500 includes a television with one or more processors embedded therein. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. The components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a non-transitory machine-readable or non-transitory computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to non-transitory, tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." An aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A computer-implemented method, the method comprising:
    responsive to determining that a total memory usage of an application exceeds a predefined threshold, performing the following operations:
        selecting a set of objects stored in volatile memory that have not been recently used by the application, wherein each object from among the set of object resides at a respective range of memory addresses in the volatile memory and each object was created by the application;
        setting, in connection with the selecting, memory protection on the respective range of addresses in the volatile memory for each object from among the selected set of objects, wherein the memory protection flags the respective range of addresses for handling when the application subsequently performs a read or write operation to the respective range of addresses;
        based on memory protection being set on the respective range of addresses, copying the selected set of objects from the volatile memory to a non-volatile memory; and
        freeing the respective range of memory addresses in the volatile memory for each object from among the selected set of objects.

2. The method of claim 1, wherein selecting the set of objects that have not been recently used is based on a least recently used (LRU) algorithm.

3. The method of claim 1, wherein the total memory usage is based on an aggregate size of objects created by the application.

4. The method of claim 1, wherein the non-volatile memory comprises a disk storage device.

5. The method of claim 1, wherein the memory protection comprises read or write protection.

6. The method of claim 1, wherein the set of objects stored in the volatile memory are divided into two respective heaps.

7. The method of claim 1, wherein the two respective heaps comprise a first heap for storing objects smaller than a predetermined size and a second heap for storing objects of equal or greater sizes than the predetermined size.

8. The method of claim 7, wherein selecting the set of objects stored in volatile memory comprises:
    determining a newest object stored in the second heap based on a respective timestamp of each object stored in the second heap; and
    selecting one or more objects stored in the second heap that are older than the newest object based on the respective timestamp of each object stored in the second heap.

9. The method of claim 8, wherein the respective timestamp indicates a time that the object was stored in the second heap.

10. The method of claim 7, wherein the second heap comprises a plurality of pages, each page of the plurality of pages having a predetermined page size, each object stored in the second heap is aligned with the predetermined page size, and each object is stored in one or more respective pages from among the plurality of pages.

11. The method of claim 1, wherein freeing the respective range of memory addresses in the volatile memory reduces the total memory usage of the application and reduces a total amount of free space on the non-volatile memory.

12. A computer-implemented method, the method comprising:
    detecting an access to an object stored in non-volatile memory by an application, wherein the access references a range of memory addresses of volatile memory where the object is stored;
    determining if the range of memory addresses of the volatile memory is set to memory protection, wherein the memory protection has flagged the range of memory addresses for handling when the application performs an operation on the respective range of addresses;
    responsive to determining that the range of memory addresses is set to memory protection, determining a set of memory addresses in a non-volatile memory where the object is stored;

moving the object from the set of memory addresses in the non-volatile memory for storing in the range of memory addresses in the volatile memory; and accessing the object stored in the range of memory addresses in volatile memory.

13. The method of claim 12, wherein the access to the object corresponds to an application that created the object.

14. The method of claim 12, wherein moving the object comprises:

copying the object from the set of memory addresses in the non-volatile memory to the range of memory addresses in volatile memory.

15. The method of claim 12, further comprising:

responsive to determining that the memory address is not set to memory protection, accessing the object stored in volatile memory.

16. A system, the system comprising:

one or more processors;

a memory comprising instructions stored therein, which when executed by the one or more processors, cause the processors to perform operations comprising:

responsive to determining that a total memory usage of an application exceeds a predefined threshold, performing the following operations:

selecting a set of objects stored in volatile memory that have not been recently used by the application, wherein each object from among the set of object resides at a respective range of memory addresses in the volatile memory and each object was created by the application;

setting, in connection with the selecting, memory protection on the respective range of addresses in the volatile memory for each object from among the set of objects, wherein the memory protection flags the respective range of addresses for handling when the application subsequently performs a read or write operation to the respective range of addresses;

based on memory protection being set on the respective range of addresses, copying the selected set of objects from the volatile memory to a non-volatile memory; and freeing the respective range of memory addresses in the volatile memory for each object from among the selected set of objects.

17. The system of claim 16, wherein the memory further comprises instructions stored therein, which when executed by the one or more processors, cause the processors to perform operations further comprising:

detecting an access to an object stored in the non-volatile memory by the application, wherein the access references a range of memory addresses of volatile memory where the object is stored;

determining if the range of memory addresses of volatile memory is set to memory protection, wherein the memory protection has flagged the range of memory addresses for handling when the application performs an operation on the respective range of addresses;

responsive to determining that the range of memory addresses is set to memory protection, determining a set of memory addresses in a non-volatile memory where the object is stored;

moving the object from the set of memory addresses in the non-volatile memory for storing in the range of memory addresses in volatile memory; and accessing the object stored in the range of memory addresses in volatile memory.

18. The system of claim 16, wherein the two respective heaps comprise a first heap for storing objects smaller than a predetermined size and a second heap for storing objects of equal or greater sizes than the predetermined size.

19. The system of claim 18, wherein the second heap comprises a plurality of pages, each page of the plurality of pages having a predetermined page size, each object stored in the second heap is aligned with the predetermined page size, and each object is stored in one or more respective pages from among the plurality of pages.

20. A non-transitory machine-readable medium comprising instructions stored therein, which when executed by a machine, cause the machine to perform operations comprising:

responsive to determining that a total memory usage of an application exceeds a predefined threshold, performing the following operations:

selecting a set of objects stored in volatile memory that have not been recently used by the application, wherein each object from among the set of object resides at a respective range of memory addresses in the volatile memory and each object was created by the application;

setting, in connection with the selecting, memory protection on the respective range of addresses in the volatile memory for each object from among the selected set of objects, wherein memory protection flags the respective range of addresses for handling when the application subsequently performs a read or write operation to the respective range of addresses;

based on memory protection being set on the respective range of addresses, copying the selected set of objects from the volatile memory to a non-volatile memory; and freeing the respective range of memory addresses in the volatile memory for each object from among the selected set of objects.

* * * * *